(12) United States Patent
Haufe (10) Patent No.: US 10,777,807 B2
(45) Date of Patent: Sep. 15, 2020

(54) SILICON PARTICLE-CONTAINING ANODE MATERIALS FOR LITHIUM ION BATTERIES

(71) Applicant: Wacker Chemie AG, Munich (DE)

(72) Inventor: Stefan Haufe, Neubiberg (DE)

(73) Assignee: Wacker Chemie AG, Munich (DE)

( * ) Notice: Subject to any disclaimer, the term of this patent is extended or adjusted under 35 U.S.C. 154(b) by 31 days.

(21) Appl. No.: 15/747,321

(22) PCT Filed: Jul. 28, 2016

(86) PCT No.: PCT/EP2016/068061
§ 371 (c)(1),
(2) Date: Jan. 24, 2018

(87) PCT Pub. No.: WO2017/025346
PCT Pub. Date: Feb. 16, 2017

(65) Prior Publication Data
US 2018/0212234 A1    Jul. 26, 2018

(30) Foreign Application Priority Data

Aug. 12, 2015   (DE) .................. 10 2015 215 415

(51) Int. Cl.
*H01M 4/00*      (2006.01)
*H01M 4/36*      (2006.01)
(Continued)

(52) U.S. Cl.
CPC ............. *H01M 4/364* (2013.01); *C01B 33/02* (2013.01); *H01M 4/386* (2013.01); *H01M 4/622* (2013.01);
(Continued)

(58) Field of Classification Search
CPC ...... H01M 4/364; H01M 4/622; H01M 4/587; H01M 10/0525; H01M 4/386; H01M 2004/027
See application file for complete search history.

(56) References Cited

U.S. PATENT DOCUMENTS

2003/0113613 A1    6/2003   Takeuchi et al.
2003/0235762 A1    12/2003  Fukui et al.
(Continued)

FOREIGN PATENT DOCUMENTS

CN    102598365 A      7/2012
DE    102013211388 A1  12/2014
(Continued)

OTHER PUBLICATIONS

Zhang et al. (2006). Study of the charging process of a LiCoO2-based Li-ion battery. Journal of Power Sources, 160, 1349-1354.
(Continued)

*Primary Examiner* — Nicholas P D'Aniello
(74) *Attorney, Agent, or Firm* — Caesar Rivise, PC (57) ABSTRACT

One aspect of the invention relates to an anode material or lithium ion batteries that is based on silicon particles, one or more binders, optionally graphite, optionally one or more additional electroconductive components, and optionally one or more additives, characterized in that the silicon particles are not aggregated and have a volume-weighted particle size distribution between the diameter percentiles $d_{10} \geq 0.2$ μm and $d_{90} \leq 20.0$ μm as well as a width $d_{90}-d_{10} \leq 15$ μm.

26 Claims, 5 Drawing Sheets

(51) Int. Cl.
*H01M 4/38* (2006.01)
*H01M 10/0525* (2010.01)
*C01B 33/02* (2006.01)
*H01M 4/62* (2006.01)
*H01M 10/42* (2006.01)
*H01M 4/587* (2010.01)
*H01M 4/02* (2006.01)

(52) U.S. Cl.
CPC ..... *H01M 10/0525* (2013.01); *C01P 2004/51* (2013.01); *H01M 4/587* (2013.01); *H01M 2004/027* (2013.01); *H01M 2010/4292* (2013.01)

(56) References Cited

U.S. PATENT DOCUMENTS

| | | |
|---|---|---|
| 2005/0214646 A1 | 9/2005 | Kubota |
| 2007/0281216 A1 | 12/2007 | Petrat et al. |
| 2009/0305129 A1 | 12/2009 | Fukui et al. |
| 2012/0135308 A1 | 5/2012 | Loveridge et al. |
| 2012/0231326 A1 | 9/2012 | Biswal et al. |
| 2013/0089776 A1 | 4/2013 | Wata et al. |
| 2014/0162131 A1* | 6/2014 | Friend .................. H01M 4/133 429/231.8 |
| 2015/0263340 A1* | 9/2015 | Gonzalez .......... H01M 10/0525 429/217 |
| 2016/0126538 A1 | 5/2016 | Hanelt et al. |
| 2016/0164085 A1 | 6/2016 | Hanelt |

FOREIGN PATENT DOCUMENTS

| | | | |
|---|---|---|---|
| DE | 102013215257 A1 | 2/2015 | |
| EP | 1730800 B1 | 5/2008 | |
| EP | 2919298 A1 * | 9/2015 | .......... H01M 4/0404 |
| GB | 2498803 A | 7/2013 | |
| JP | 2003007342 A | 1/2003 | |
| JP | 4911835 B2 | 4/2012 | |
| KR | 1020130050857 A | 5/2013 | |
| WO | WO 2012120895 A1 | 9/2012 | |
| WO | 2014202529 A1 | 12/2014 | |

OTHER PUBLICATIONS

English language abstract for JP 4911835 B2 (2012).
Gauthier et al. (2014). From Si wafers to cheap and efficient Si electrodes for Li-ion batteries. Journal of Power Sources, 256, 32-36.
Jin et al. (2008). The influence of mechanochemical activation on combustion synthesis of Si3N4. Ceramics International, 34(5), 1267-1271.
Khang et al. (2010). Synthesis of Si nanoparticles with narrow size distribution by pulsed laser ablation. Journal of Nanoparticle Research, 12(4), 1349-1354.
International Search Report from corresponding PCT/EP2016/068061 dated Oct. 5, 2016.
English Abstract for JP 2003007342 A (2003).

* cited by examiner

SILICON PARTICLE-CONTAINING ANODE MATERIALS FOR LITHIUM ION BATTERIES

CROSS-REFERENCE TO RELATED APPLICATIONS

This application is a U.S. National Phase Application of PCT/EP2016/068061, filed Jul. 28, 2016, which claims priority from DE 10 2015 215 415.7, filed Aug. 12, 2015, the contents of which applications are incorporated herein by reference in their entireties for all purposes.

BACKGROUND OF THE INVENTION

The invention relates to anode materials containing silicon particles, the use thereof for producing lithium ion batteries and also the lithium ion batteries obtainable in this way.

Rechargeable lithium ion batteries are today the practical electrochemical energy stores having the highest gravimetric energy densities of, for example, up to 250 Wh/kg. They are used first and foremost in the field of portable electronics, for tools and also for electrically powered transport means, for example bicycles or automobiles. However, especially for use in automobiles, it is necessary to achieve a further significant increase in the energy density of the batteries in order to attain longer electric ranges of the vehicles.

At present, graphitic carbon is widespread as material for the negative electrode ("anode") of lithium ion batteries. During incorporation and release of lithium, i.e. during charging and discharging of the battery, graphitic carbon advantageously experiences only small volume changes, for example in the region of 10% for the limiting stoichiometry of $LiC_6$. However, a disadvantage is its relatively low electrochemical capacity of theoretically not more than 372 mAh per gram of graphite, which corresponds to only about one tenth of the electrochemical capacity which is theoretically achievable when using lithium metal.

For this reason, there has for a long time been a search for alternative materials for anodes, especially in the field of (semi)metals which form alloys with lithium. A challenge here is frequently the large volume expansion during incorporation or release of lithium into/from the alloy-forming (semi)metals, which is more than 200%, sometimes even up to 300%.

Silicon forms binary electrochemically active alloys with lithium and these can have a very high lithium content. The known maximum lithium content is found in $Li_{4.4}Si$, which corresponds to a very high theoretical specific capacity in the region of 4200 mAh per gram of silicon. Disadvantageously, the incorporation and release of lithium into/from silicon is associated with a very large volume change which can attain 300%. This volume expansion leads to high mechanical stressing of the crystallites which ultimately leads to them breaking apart. This process, which is referred to as electrochemical milling, leads to a loss of electrical contacting in the active material and in the electrode structure and thus to destruction of the electrode with a loss of capacity. The decrease in the capacity during the course of a number of charging and discharging cycles is referred to as fading or continuous capacity decrease and is generally irreversible. For example, mixtures of micron-scale silicon and carbon give corresponding electrodes having very high initial capacities of more than 2000 mAh/g, but these suffer from pronounced fading.

To reduce the mechanical stress and thus to prevent electrochemical milling, the use of nanosize silicon particles for anodes of lithium ion cells has frequently been recommended. With regard to size and shape of the nanosize silicon particles, the teaching goes in a variety of directions in the literature. Thus, anode materials based on nanosize or nanostructured silicon particles having average particle sizes of, for example, <0.2 μm have frequently been described. EP 1730800 teaches electrode material for lithium ion batteries which contains nanosize silicon particles which have average primary particle diameters of from 5 to 200 nm and are joined together to form aggregates having sizes of up to 1000 nm. WO 2014/202529, too, recommends nanosize silicon particles for electrode material for lithium ion batteries having volume-weighted particle size distributions between the diameter percentiles $d_{10}>20$ nm and $d_{90}<2000$ nm. For example, $d_{10}$ values of 80 nm and 120 nm and also $d_{50}$ values of 190 nm and 150 nm are specifically disclosed.

In a Journal of Power Sources, 256, 2014, pages 32 to 36, M. Gauthier discusses anode materials comprising silicon particles which are characterized by very broad, multimodal size distributions and comprise, for example, nanosize particles in the region of 40 nm and considerable proportions of coarse particles having diameters of >>30 μm. The half cells described do not yet achieve the coulombic efficiency required in practice. Electrode materials containing coarse silicon particles are known, for example, from US 2003235762, and these have a content of silicon particles having particle diameters of from 1 to 10 μm of at least 60% by volume. US 2003235762 says nothing about the production process for the silicon particles and thus also does not implicitly disclose the particle shape or sphericity of the silicon particles and in particular no unaggregated silicon particles. Aggregated and unaggregated silicon particles are not distinguishable by means of the static light scattering usually used for determining particle diameters. The active material of US 2009305129 contains silicon particles having crystallite sizes of <100 nm and particle sizes of from 7 to 25 μm, which are produced by gas-phase processes. The silicon particles of the lithium ion batteries of US 2005/0214646 have average particle diameters of 1 μm. US 2005/0214646 is silent about the particle size distribution and the production of the silicon particles. US 2005/0214646 advises a lithium/silicon ratio of not more than 4.0 for the anode material of the charged batteries. Molar Li/Si ratios of, for example, 3.5 and above are specifically described. JP 4911835 teaches Li/Si ratios for the anode material of charged lithium ion batteries in the range from 2.3 and 4.0.

Previously known nanosize silicon particles continue to lead to high initial and continuous capacity losses in lithium ion batteries. The reason for this is the volume change experienced by the silicon particles during charging and discharging of the lithium ion batteries and the associated mechanical attrition of the anode. In addition, the surface of the silicon anode material reacts with constituents of the electrolyte with continuous formation of passivating protective layers (solid electrolyte interface; SEI), which leads to immobilizing of lithium. Due to the volume change experienced by the silicon, these passivating protective layers are only partially stable, so that a certain amount of lithium is immobilized during each charging/discharging cycle. Since the amount of mobile lithium in the full cell, which corresponds to the usable capacity, is limited by the cathode material, this is quickly consumed and the capacity of the cell is decreased after too few cycles. The decrease in the reversible capacity of lithium ion batteries during continuing cycles is also referred to as fading.

BRIEF SUMMARY OF THE INVENTION

In the light of this background, it was an object of the present invention to provide an anode material for lithium ion batteries which in the full cell has a high reversible capacity, with, if possible, at the same time an only small irreversible capacity loss being obtained in the first cycle and stable electrochemical behavior with very little fading being achieved in the subsequent cycles. A further objective was to provide anode material for lithium ion batteries which has satisfactory mechanical stability during repeated charging and discharging.

The object has surprisingly been achieved by means of anode material which contained unaggregated silicon particles having the particle size distribution according to the invention. The object could be achieved even better when the lithium ion batteries produced using anode material according to the invention were operated so that the anode material was only partially lithiated in the fully charged battery.

The invention provides an anode material for lithium ion batteries which is based on silicon particles, one or more binders, optionally graphite, optionally one or more further electrically conductive components and optionally one or more additives, characterized in that the silicon particles are unaggregated and have a volume-weighted particle size distribution between the diameter percentiles $d_{10} \geq 0.2$ µm and $d_{90} \leq 20.0$ µm and also a breadth $d_{90}-d_{10} \leq 15$ µm.

The invention further provides for the use of the anode material of the invention for producing lithium ion batteries.

The invention further provides lithium ion batteries comprising an anode based on anode material according to the invention.

DETAILED DESCRIPTION OF PREFERRED EMBODIMENTS

For the purposes of the present invention, an anode material is an electrode material which is based on a mixture of a plurality of substances and allows, by means of oxidation or reduction reactions, electrochemical energy to be stored in a battery or taken from a battery. The electrode material which in the charged battery supplies energy while an oxidative electrochemical reaction proceeds is referred to as anode material or else as negative electrode material.

The volume-weighted particle size distribution of the silicon particles is preferably between the diameter percentiles $d_{10} \geq 0.2$ µm and $d_{90} \leq 20.0$ µm, particularly preferably between $d_{10} \geq 0.2$ µm and $d_{90} \leq 10.0$ µm and most preferably from $d_{10} \geq 0.2$ µm to $d_{90} \leq 5.0$ µm. The silicon particles have a volume-weighted particle size distribution with diameter percentiles $d_{10}$ of preferably $\leq 10$ µm, particularly preferably $\leq 5$ µm, even more preferably $\leq 3$ µm and most preferably $\leq 1$ µm. The silicon particles have a volume-weighted particle size distribution with diameter percentiles $d_{90}$ of preferably $\geq 0.5$ µm and particularly preferably $\geq 5$ µm.

The volume-weighted particle size distribution of the silicon particles has a breadth $d_{90}-d_{10}$ of preferably $\leq 15.0$ µm, more preferably $\leq 12.0$ µm, even more preferably $\leq 10.0$ µm, particularly preferably $\leq 8.0$ µm and most preferably $\leq 4.0$ µm. The volume-weighted particle size distribution of the silicon particles has a breadth $d_{90}-d_{10}$ of preferably $\geq 0.6$ µm, particularly preferably $\geq 0.8$ µm and most preferably $\geq 1.0$ µm.

The volume-weighted particle size distribution of the silicon particles has diameter percentiles $d_{50}$ of preferably from 0.5 to 10.0 µm, particularly preferably from 0.6 to 7.0 µm and most preferably from 0.7 to 3.0 µm.

From twice to five times, in particular from twice to three times, the abovementioned $d_{50}$ values is preferably less than the layer thickness of the anode coating. The layer thickness of the anode coating is indicated further below. This condition is helpful in order to virtually rule out oversize particles.

The volume-weighted particle size distribution of the silicon particles can be determined by static laser light scattering using the Mie model by means of the measuring instrument Horiba LA 950 with ethanol as dispersing medium for the silicon particles.

The volume-weighted particle size distribution of the silicon particles is preferably monomodal. The volume-weighted particle size distribution of the silicon particles is generally narrow, as can be seen from the $d_{10}$ or $d_{90}$ values and also $d_{90}-d_{10}$ values.

The silicon particles are not aggregated, preferably not agglomerated and/or preferably not nanostructured. Aggregated means that spherical or largely spherical primary particles as are, for example, initially formed in gas-phase processes in the production of the silicon particles grow together in the further course of the reaction of the gas-phase process to form aggregates. These aggregates can form agglomerates during the further course of the reaction. Agglomerates are a loose assembly of aggregates. Agglomerates can easily be broken up again into the aggregates by means of kneading and dispersing processes which are typically used. Aggregates cannot be or can only partially be broken up into the primary particles by means of these processes. Owing to their formation, aggregates and agglomerates inevitably have very different sphericities and particle shapes than the silicon particles according to the invention. The presence of silicon particles in the form of aggregates or agglomerates can be made visible by means of, for example, conventional scanning electron microscopy (SEM). By contrast, static light scattering methods for determining the particle size distributions or particle diameters of silicon particles cannot differentiate between aggregates and agglomerates.

Silicon particles which are not nanostructured generally have characteristic BET surface areas. The BET surface areas of the silicon particles are preferably from 0.01 to 30.0 m²/g, more preferably from 0.1 to 25.0 m²/g, particularly preferably from 0.2 to 20.0 m²/g and most preferably from 0.2 to 18.0 m²/g. The BET surface area is determined in accordance with DIN 66131 (using nitrogen).

The silicon particles have a sphericity of preferably 0.3≤ψ≤0.9, particularly preferably 0.5≤ψ≤0.85 and most preferably 0.65≤ψ≤0.85. Silicon particles having such sphericities are accessible, in particular, by production by means of milling processes. The sphericity ψ is the ratio of the surface area of a sphere of the same volume to the actual surface area of a body (definition of Wadell). Sphericities can, for example, be determined from conventional scanning electron micrographs.

The international standard of the "Federation Europeenne de la Manutention" gives, in FEM 2.581, an overview of the aspects under which a bulk material is to be examined. The standard FEM 2.582 defines the general and specific bulk material properties in respect of the classification. Characteristic values which describe the consistency and the state of the material are, for example, particle shape and particle size distribution (FEM 2.581/FEM 2.582: General characteristics of bulk products with regard to their classification and their symbolization).

According to DIN ISO 3435, bulk materials can be divided as a function of the nature of the particle edges into 6 different particle shapes:
I: sharp edges having approximately equal dimensions in the three directions in space (example: cube);
II: sharp edges of which one is significantly longer than the other two (example: prism, blade);
III: sharp edges of which one is significantly smaller than the other two (example: plate, flake);
IV: round edges having approximately equal dimensions in the three directions in space (example: sphere);
V: round edges, significantly larger in one direction than in the other two (example: cylinder, rod);
VI: fibrous, thread-like, lock-like, entangled.

According to this classification of bulk materials, the silicon particles, in particular the silicon particles produced by milling processes, are preferably particles of the particle shapes I, II or III.

The silicon particles can consist of elemental silicon, a silicon oxide or a binary, ternary or multinary silicon-metal alloy (with, for example, Li, Na, K, Sn, Ca, Co, Ni, Cu, Cr, Ti, Al, Fe). Preference is given to using elemental silicon, especially since this has an advantageously high storage capacity for lithium ions.

For the purposes of the present invention, elemental silicon is high-purity polysilicon having a low proportion of foreign atoms (for example B, P, As), silicon doped in a targeted manner with foreign atoms (for example B, P, As) or else silicon from metallurgical processing, which can have elemental contamination (for example Fe, Al, Ca, Cu, Zr, C).

If the silicon particles contain a silicon oxide, then the stoichiometry of the oxide $SiO_x$ is preferably in the range 0<x<1.3. If the silicon particles contain a silicon oxide having a higher stoichiometry, then the layer thickness of this on the surface is preferably less than 10 nm.

When the silicon particles are alloyed with an alkali metal M, then the stoichiometry of the alloy $M_ySi$ is preferably in the range 0<y<5. The silicon particles can optionally be prelithiated. If the silicon particles are alloyed with lithium, the stoichiometry of the alloy $Li_zSi$ is preferably in the range 0<z<2.2.

Particular preference is given to silicon particles which contain ≥80 mol % of silicon and/or ≤20 mol % of foreign atoms, very particularly preferably ≤10 mol % of foreign atoms, in the interior.

The surface of the silicon particles can optionally be covered by an oxide layer or by other inorganic and organic groups. Particularly preferred silicon particles bear Si—OH or Si—H groups or covalently bound organic groups such as alcohols or alkenes on the surface. The surface tension, for example, of the silicon particles can be controlled by the organic groups and in particular be matched to the solvents or binders which may be used in the production of the anode coatings.

The lithium ion batteries are preferably constructed and/or are preferably operated in such a way that the anode material is only partially lithiated in the fully charged battery. "Fully charged" refers to the state of the battery in which the anode material of the battery has its highest loading of lithium. Partial lithiation of the anode material means that the maximum lithium uptake capacity of the silicon particles in the anode material is not exploited. The maximum lithium uptake capacity of the silicon particles corresponds to the formula $Li_{4.4}Si$ and is thus 4.4 lithium atoms per silicon atom, which corresponds to a maximum specific capacity of 4200 mAh per gram of silicon.

The present invention thus also provides methods of operating lithium ion batteries, characterized in that the anode material is only partially lithiated in the fully charged lithium ion battery.

The ratio of lithium atoms to silicon atoms in the anode of a lithium ion battery (Li/Si ratio) can, for example, be set via the electric charging flux. The degree of lithiation of the anode material or of the silicon particles present in the anode material is proportional to the electric charge which has flowed. In this variant, the capacity of the anode material for lithium is not fully exploited during charging of the lithium ion battery. This results in partial lithiation of the anode.

In an alternative, preferred variant, the Li/Si ratio of a lithium ion battery is set by cell balancing. Here, the lithium ion batteries are designed so that the lithium uptake capacity of the anode is preferably greater than the lithium release capacity of the cathode. This leads to the lithium uptake capacity of the anode not being fully exploited in the fully charged battery, i.e. the anode material is only partially lithiated.

In the case of the partial lithiation according to the invention, the Li/Si ratio in the anode material in the fully charged state of the lithium ion battery is preferably ≤2.2, particularly preferably ≤1.98 and most preferably ≤1.76. The Li/Si ratio in the anode material in the fully charged state of the lithium ion battery is preferably ≥0.22, particularly preferably ≥0.44 and most preferably ≥0.66.

The capacity of the silicon of the anode material of the lithium ion battery is preferably utilized to an extent of ≤50%, particularly preferably ≤45% and most preferably ≤40%, based on a capacity of 4200 mAh per gram of silicon.

The degree of lithiation of silicon or the utilization of the capacity of silicon for lithium (Si capacity utilization α) can, for example, be determined with the aid of the following formula:

$$\alpha = \frac{\beta}{\gamma \cdot FG \cdot \omega_{Si}}$$

β: delithiation capacity of the Si-containing anode at the respective end-of-charge voltage of the lithium ion battery;

γ: maximum capacity of silicon for lithium at a stoichiometry of $Li_{22}Si_5$ (corresponds to 4200 mAh/g);

FG: weight per unit area of the anode coating;

$\omega_{Si}$: proportion by weight of Si in the anode coating.

Determination of the delithiation capacity β: The lithium ion battery is firstly brought to the electrically charged state by being charged by the cc (constant current) method at a constant current of 5 mA/g (corresponds to C/25) until the voltage limit of 4.2 V is reached. The anode is lithiated here.

The lithium ion battery which has been charged in this way is opened, the anode is taken out and a button half cell (type CR2032, Hohsen Corp.) is constructed using this and a lithium counterelectrode (Rockwood Lithium, thickness 0.5 mm, Dm=15 mm). A glass fiber filter paper (Whatman, GD type D) impregnated with 120 μl of electrolyte can serve as separator (Dm=16 mm). A 1.0 molar solution of lithium hexafluorophosphate in a 3:7 (v/v) mixture of fluoroethylene carbonate and ethyl methyl carbonate, which solution has been admixed with 2.0% by weight of vinylene carbonate, is used as electrolyte. The construction of the cell is generally carried out in a glove box (<1 ppm of $H_2O$ and $O_2$). The water content of the dry mass of all starting materials is preferably below 20 ppm.

The delithiation capacity β of the Si-containing anode coating is determined by charging the button half cell produced in this way (working electrode=positive electrode=Si anode; counterelectrode=negative electrode=lithium) at C/25 until the voltage limit of 1.5 V has been reached. The electrochemical measurements on full cell and half cell are carried out at 20° C.

The abovementioned constant current is based on the weight of the coating of the positive electrode.

Determination of the proportion by weight of Si, $\omega_{Si}$: Electrolyte is firstly washed out from a sample of the completely delithiated anode coating (without Cu foil) using tetrahydrofuran. A sample is subsequently digested by means of acid. For this purpose, 75 mg of the anode coating are transferred into a microwave digestion vessel (100 ml TFM liner from Anton-Paar) and admixed with 5 ml of $HNO_3$ (65% strength, AR), 0.25 ml of HCl (37% strength, AR) and 1 ml of HF (40% strength, ultrapure). The microwave digestion vessel is closed, introduced into a microwave apparatus (Multiwave 3000 Anton Paar) and treated for 45 minutes at 950 W. The digested mixture is transferred completely into 50 ml tubes and made up to 50 ml with water. Of this, 0.50 ml are taken off, admixed with 2.50 ml of 4% strength boric acid and again made up to 50 ml (dilution: factor of 100). The proportion by weight of Si, $\omega_{Si}$, is determined by means of ICP-OES (inductively coupled plasma-emission spectrometry) (measuring instrument: Optima 7300 DV, from Perkin Elmer; sample introduction system: Meinhard atomizer with cyclone spray chamber; calibration range: 0.1 to 20.0 mg/l of Si; Si standard stock solution Certipur from Merck with 1000 mg/l of Si (certified)).

The proportion of silicon in the anode material is preferably in the range from 40% by weight to 95% by weight, particularly preferably from 50% by weight to 90% by weight and most preferably from 60% by weight to 80% by weight, based on the total weight of the anode material.

The silicon particles can, for example, be produced by milling processes. On the other hand, the widely used vapor deposition process is generally unsuitable for producing silicon particles configured according to the invention.

Silicon particles having the properties according to the invention, for example with advantageous sphericities, like the fracture surfaces advantageous in the application, in particular sharp-edged fracture surfaces, or, for example, splinter-like silicon particles, are obtainable by milling processes. The particle size distributions of the silicon particles and unaggregated silicon particles which are important for the purposes of the invention are also very readily obtainable by milling processes.

Silicon particles produced by gas-phase processes, on the other hand, generally have a round or an acicular shape. Aggregation of the particles typically occurs in vapor deposition processes. To produce unaggregated silicon particles by means of gas-phase processes, the gas-phase reactors would have to be operated with extremely low gas concentrations or extremely short residence times in the reactor, but this counters the formation of silicon particles having the p-scale particle size according to the invention and leads to industrially unfeasible production times. On the other hand, if aggregated silicon particles are acceptable, gas-phase processes are best suited for the production of p-scale Si aggregates having a primary particle size in the nanometer range.

Possible milling processes are, for example, dry or wet milling processes. Here, preference is given to using planetary ball mills, jet mills, e.g. opposed jet or impact mills, or stirred ball mills.

Milling in a jet mill is preferably carried out using nitrogen or noble gases, preferably argon, as milling gas. The jet mills preferably have an integrated air classifier which can operate statically or dynamically, or the mills are operated with circulation through an external air classifier.

One or more organic or inorganic liquids or liquid mixtures can be used for the milling in order to produce the silicon particles in suspension. Such liquids or liquid mixtures preferably have a viscosity at room temperature of preferably less than 100 mPas and particularly preferably less than 10 mPas. The liquids or liquid mixtures are preferably inert or only slightly reactive toward silicon. Particular preference is given to the liquid being organic and containing less than 5% by weight of water, particularly preferably less than 1% by weight of water. Preferred organic liquids are hydrocarbons, esters or in particular alcohols. The alcohols preferably contain from 1 to 7 and particularly preferably from 2 to 5 carbon atoms. Examples of alcohols are methanol, ethanol, propanol and butanol. Preference is given to ethanol and 2-propanol. Hydrocarbons preferably contain from 5 to 10 and particularly preferably from 6 to 8 carbon atoms. Hydrocarbons can, for example, be aliphatic or aromatic. Examples of hydrocarbons are toluene and heptane. Esters are generally esters of carboxylic acids and alkyl alcohols, for example ethyl acetate.

In the production of the silicon particles by wet milling in a suspension, preference is given to using milling media whose average diameter is from 10 to 1000 times greater than the $d_{90}$ value of the distribution of the material to be milled. Particular preference is given to milling media whose average diameter is from 20 to 200 times greater than the $d_{90}$ value of the initial distribution of the material to be milled.

The anode material is preferably based on a mixture comprising silicon particles, one or more binders, optionally graphite, optionally one or more further electrically conductive components and optionally one or more additives.

The use of further electrically conductive components in the anode material enables the transition resistances within the electrode and between electrode and power outlet lead to be reduced, which improves the power loadability of the lithium ion battery. Preferred further electrically conductive components are conductive carbon black, carbon nanotubes or metallic particles, for example copper.

The further electrically conductive components preferably have nanosize structures of ≤800 nm. The primary particles of conductive carbon black preferably have a volume-weighted particle size distribution between the diameter percentiles $d_{10}$=5 nm and $d_{90}$=200 nm. The primary particles of conductive carbon black can also be branched in a chain-like manner and form structures up to μm sizes. Carbon nanotubes preferably have a diameter of from 0.4 to 200 nm, particularly preferably from 2 to 100 nm and most preferably from 5 to 30 nm. The metallic particles have a volume-weighted particle size distribution between the diameter percentiles $d_{10}$=5 nm and $d_{90}$=800 nm.

The anode material preferably contains from 0 to 40% by weight, particularly preferably from 0 to 30% by weight and most preferably from 0 to 20% by weight, of one or more further electrically conductive components, based on the total weight of the anode material.

Preferred binders are polyacrylic acid or alkali metal, in particular lithium or sodium, salts thereof, polyvinyl alcohols, cellulose or cellulose derivatives, polyvinylidene fluoride, polytetrafluoroethylene, polyolefins, polyimides, in particular polyamidimides, or thermoplastic elastomers, in particular ethylene-propylene-diene terpolymers. Particular preference is given to polyacrylic acid, polymethacrylic acid or cellulose derivatives, in particular carboxymethylcellulose. Particular preference is also given to the alkali metal, in particular lithium or sodium, salts of the abovementioned binders. The greatest preference is given to the alkali metal salts, in particular lithium or sodium salts, of polyacrylic acid or of polymethacrylic acid. It is possible for all or preferably part of the acid groups of a binder to be present in the form of salts. The binders have a molar mass of preferably from 100 000 to 1 000 000 g/mol. It is also possible to use mixtures of two or more binders.

As graphite, it is generally possible to use natural or synthetic graphite. The graphite particles preferably have a volume-weighted particle size distribution between the diameter percentiles $d_{10}$>0.2 μm and $d_{90}$<200 μm.

Examples of additives are pore formers, dispersants, leveling agents or dopants, for example elemental lithium.

Preferred formulations for the anode material of the lithium ion batteries preferably contain from 5 to 95% by weight, in particular from 60 to 85% by weight, of silicon particles; from 0 to 40% by weight, in particular from 0 to 20% by weight, of further electrically conductive components; from 0 to 80% by weight, in particular from 5 to 30% by weight, of graphite; from 0 to 25% by weight, in particular from 5 to 15% by weight, of binders; and optionally from 0 to 80% by weight, in particular from 0.1 to 5% by weight, of additives; where the figures in percent by weight are based on the total weight of the anode material and the proportions of all constituents of the anode material add up to 100% by weight.

In a preferred formulation for the anode material, the proportion of graphite particles and further electrically conductive components in total is at least 10% by weight, based on the total weight of the anode material.

The processing of the constituents of the anode material to give an anode ink or paste can, for example, be carried out in a solvent such as water, hexane, toluene, tetrahydrofuran, N-methylpyrrolidone, N-ethylpyrrolidone, acetone, ethyl acetate, dimethyl sulfoxide, dimethylacetamide or ethanol or solvent mixtures, preferably using rotor-stator machines, high-energy mills, planetary kneaders, stirred ball mills, shaking plates or ultrasound apparatuses.

The anode ink or paste has a pH of preferably from 2 to 7.5 (determined at 20° C., for example using the pH meter model WTW pH 340i with SenTix RJD probe).

The anode ink or paste can, for example, be applied by doctor blade to a copper foil or another current collector. Other coating methods, e.g. spin coating, roller coating, dipping or slot nozzle coating, painting or spraying, can likewise be used.

The layer thickness, i.e. the dry layer thickness, of the anode coating is preferably from 2 μm to 500 μm, particularly preferably from 10 μm to 300 μm.

Before coating of the copper foil with the anode material of the invention, the copper foil can be treated with a commercial primer, for example a primer based on polymer resins or silanes. Primers can lead to an improvement in the adhesion to the copper, but themselves generally have virtually no electrochemical activity.

The anode material is generally dried to constant weight. The drying temperature depends on the components employed and the solvent used. It is preferably in the range from 20° C. to 300° C., particularly preferably from 50° C. to 150° C.

Finally, the electrode coatings can be calendered in order to set a defined porosity.

A lithium ion battery generally comprises a first electrode as cathode, a second electrode as anode, a membrane as separator arranged between the two electrodes, two electrically conductive connections to the electrodes, a housing accommodating the parts mentioned and also an electrolyte which contains lithium ions and with which the separator and the two electrodes are impregnated, with part of the second electrode containing the anode material of the invention.

As preferred cathode materials, it is possible to use lithium cobalt oxide, lithium nickel oxide, lithium nickel cobalt oxide (doped or undoped), lithium manganese oxide (spinel), lithium nickel cobalt manganese oxides, lithium nickel manganese oxides, lithium iron phosphate, lithium cobalt phosphate, lithium manganese phosphate, lithium vanadium phosphate or lithium vanadium oxides.

The separator is generally an electrically insulating membrane which is permeable to ions, as is customary in battery production. As is known, the separator separates the first electrode from the second electrode and thus prevents electronically conductive connections between the electrodes (short circuit).

The electrolyte is usually a solution of a lithium salt (=electrolyte salt) in an aprotic solvent. Electrolyte salts which can be used are, for example, lithium hexafluorophosphate, lithium hexafluoroarsenate, lithium perchlorate, lithium tetrafluoroborate, $LiCF_3SO_3$, $LiN(CF_3SO_2)$ or lithium borates. The concentration of the electrolyte salt, based on the solvent, is preferably in the range from 0.5 mol/l to the solubility limit of the respective salt. It is particularly preferably from 0.8 mol/l to 1.2 mol/l.

As solvent, it is possible to use cyclic carbonates, propylene carbonate, ethylene carbonate, fluoroethylene carbonate, dimethyl carbonate, diethyl carbonate, ethyl methyl carbonate, dimethoxyethane, diethoxyethane, tetrahydrofuran, 2-methyltetrahydrofuran, gamma-butyrolactone, dioxolane, acetonitrile, organic carboxylic esters or nitriles, either individually or as mixtures thereof.

The electrolyte preferably contains a film former such as vinylene carbonate or fluoroethylene carbonate. This makes it possible to achieve a significant improvement in the cycling stability of the inventive anode containing silicon particles. This is attributed mainly to formation of a solid electrolyte intermediate phase on the surface of active particles. The proportion of the film former in the electrolyte is preferably in the range from 0.1% by weight to 20.0% by weight, particularly preferably from 0.2% by weight to 15.0% by weight and most preferably from 0.5% by weight to 10% by weight.

In order to match actual capacities of the electrodes of a lithium ion cell as optimally as possible to one another, an attempt is made to balance the amount of the materials for the positive and negative electrodes. In this context, it is particularly important for a covering layer to be formed on the surface of the electrochemically active materials in the anode during the first or initial charging/discharging cycle of secondary lithium ion cells (known as formation). This covering layer is referred to as "solid electrolyte interphase" (SEI) and generally consists mainly of electrolyte decomposition products and also a certain amount of lithium, which is accordingly no longer available for further charging/discharging reactions. The thickness and composition of the SEI depends on the type and quality of the anode material used and the electrolyte solution used.

The SEI is particularly thin in the case of graphite. On graphite, a loss of usually from 5% to 35% of the mobile lithium occurs in the first charging step. The reversible capacity of the battery also decreases correspondingly.

In the case of anodes comprising the anode material of the invention, a loss of mobile lithium of preferably ≤30%, particularly preferably ≤20% and most preferably ≤10%, occurs in the first charging step.

The lithium ion battery according to the invention can be produced in all customary shapes, for example in wound, folded or stacked form.

All substances and materials utilized for producing the lithium ion battery of the invention, as described above, are known. The production of the parts of the battery of the invention and the assembly of these to produce the battery according to the invention is carried out by methods known in the field of battery production.

The anode materials of the invention surprisingly lead to lithium ion batteries having improved cycling behavior. Thus, it is possible to produce lithium ion batteries having a low irreversible loss of capacity in the first charging cycle and stable electrochemical behavior with only slight fading in the subsequent cycles. In particular, the initial loss of lithium resulting from the decomposition of electrolyte at the active material surface on first lithiation with protective layer formation (=solid electrolyte interface, SEI) is also reduced. It is possible to achieve initial losses of capacity which are comparable to the graphite standard.

The cycling behavior can be improved further by operating the lithium ion batteries in such a way that the anodes containing silicon particles are only partially lithiated in the fully charged battery. As a result, the SEI and the mechanical stress on material are also reduced, so that fading can be reduced further and the reversible capacity can be increased. In total, the continuous loss is reduced and the cycling stability of the lithium ion batteries is improved thereby.

Thus, both the initial and the continuous loss of capacity of Si-based anode materials can be minimized by means of the procedure according to the invention. Overall, the anode material of the invention and the lithium ion batteries of the invention have very good stability. This means that even after many cycles, fatigue phenomena as occur, for example, as a result of mechanical destruction of the anode material of the invention and lead to a loss in capacity barely occur.

Lithium ion batteries which have not only the abovementioned advantageous cycling behavior but at the same time also a high volumetric energy density can surprisingly be obtained by means of the procedure according to the invention.

The following examples serve to illustrate the invention:

EXAMPLE 1

Production of unaggregated, splinter-shaped, sub-μm silicon particles by milling:

A mixture of 2 kg of ethanol (purity 99%) and 500 g of pure silicon having a particle distribution with $d_{10}$=8 μm, $d_{50}$=15 μm and $d_{90}$=25 μm, which had been produced from coarser particles using a fluidized-bed jet mill, was produced and stirred for 20 minutes until the entire solid was finely dispersed in the suspension.

The milling space of a Netzsch LabStar LS1 laboratory stirred ball mill with the milling system ZETA ceramic was charged with 490 ml of yttrium oxide-stabilized zirconium oxide milling beads having an average diameter of 0.3 mm and closed. The suspension of silicon dust and ethanol was then introduced into the cooled reservoir of the mill and circulated by pumping through the mill at a throughput of 40 kg/h. The particles in the suspension were milled for 55 minutes at a speed of rotation of the mill of 3000 rpm. After the milling operation, ethanol was added to the suspension until its solid concentration was 21.8% by weight.

Figure 1:
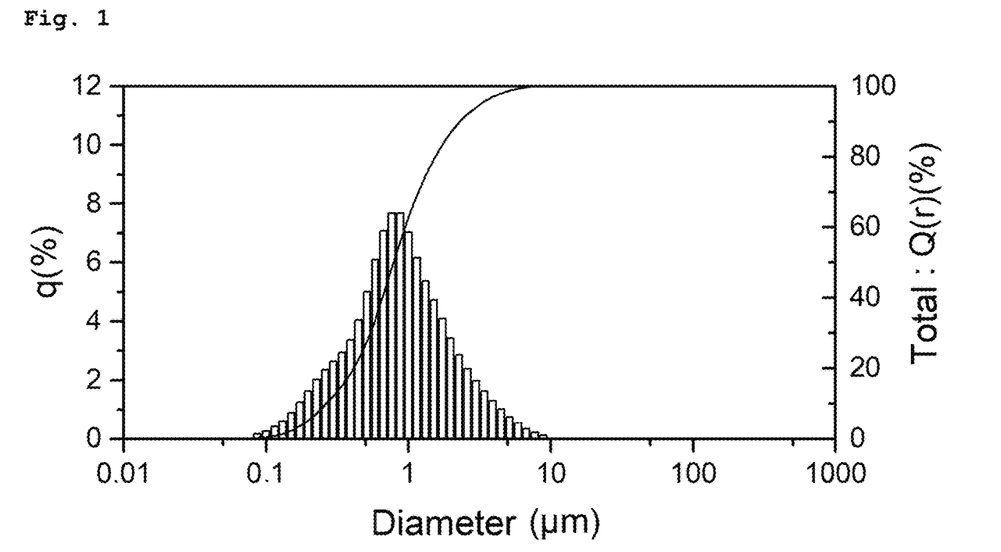
FIG. 1 shows a graph of particle diameter distribution of the silicon particles of Example 1.

Measurement of the particle distribution by static laser light scattering using the Mie model by means of a Horiba LA 950 in a greatly diluted suspension in ethanol gave $d_{10}$=0.26 μm, $d_{50}$=0.79 μm and $d_{90}$=2.30 μm and a breadth ($d_{90}$–$d_{10}$) of 2.0 μm, as depicted in FIG. 1. 5 ml of the suspension were dried at 120° C. at 20 mbar in a vacuum drying oven for 16 hours.

Figure 2:
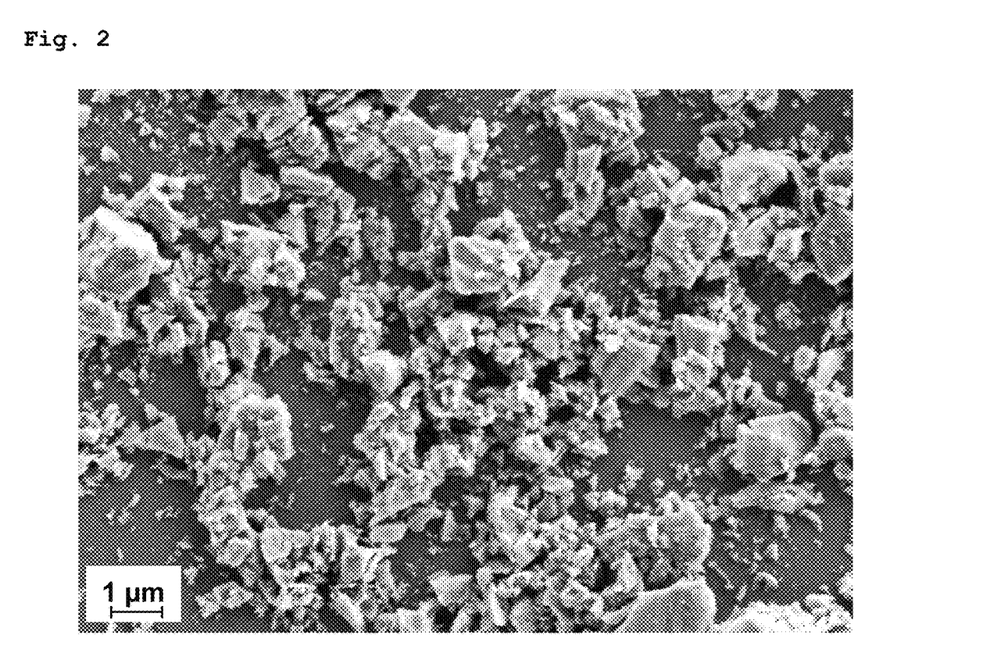
FIG. 2 shows a scanning electron micrograph of the silicon particles of Example 1.

The scanning electron micrograph of the dry Si dust in FIG. 2 shows that the sample consists of individual, unaggregated, splinter-shaped particles.

EXAMPLE 2

Production of an anode according to the invention using the silicon particles from example 1, graphite and binder by physical mixing:

11.0 g of the 21.8% strength by weight Si suspension in ethanol from example 1 were dispersed in 12.52 g of a 1.4% strength by weight solution of sodium carboxymethylcellulose (Daicel, Grade 1380) in water by means of a high-speed mixer at a circumferential velocity of 4.5 m/s for 5 minutes and of 17 m/s for 30 minutes with cooling at 20° C. After addition of 0.856 g of graphite (Imerys, KS6L C), the mixture was then stirred at a circumferential velocity of 12 m/s for a further 30 minutes. After degassing, the suspension was applied by means of a film drawing frame having a gap height of 0.20 mm (Erichsen, Model 360) to a copper foil having a thickness of 0.030 mm (Schlenk Metallfolien, SE-Cu58). The anode coating produced in this way was subsequently dried for 60 minutes at 80° C. and an air pressure of 1 bar. The average weight per unit area of the dry anode coating was 2.90 mg/cm².

Figure 3:
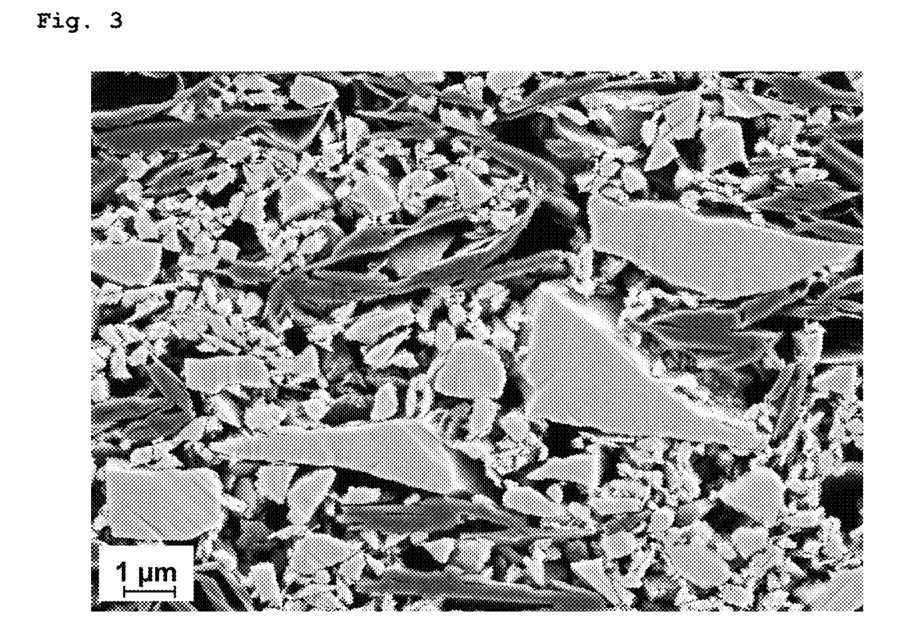
FIG. 3 shows a scanning electron micrograph of the ion ramp section of the anode coating of Example 2.

A scanning electron micrograph of the ion ramp section of the anode coating is depicted in FIG. 3.

EXAMPLE 3

Ex. 3

Lithium ion battery comprising the anode from example 2:

The electrochemical studies were carried out on a button cell (type CR2032, Hohsen Corp.) in a 2-electrode arrangement. The electrode coating from example 2 was used as counterelectrode or negative electrode (Dm=15 mm), and a coating based on lithium nickel manganese cobalt oxide 1:1:1 having a content of 94.0% and an average weight per unit area of 14.5 mg/cm$^2$ (procured from Custom Cells) was used as working electrode or positive electrode (Dm=15 mm). A glass fiber filter paper (Whatman, GD type D) impregnated with 120 µl of electrolyte served as separator (Dm=16 mm). The electrolyte used consisted of a 1.0 molar solution of lithium hexafluorophosphate in a 3:7 (v/v) mixture of fluoroethylene carbonate and ethyl methyl carbonate, which solution had been admixed with 2.0% by weight of vinylene carbonate. The construction of the cell was carried out in a glove box (<1 ppm H$_2$O, O$_2$), and the water content in the dry mass of all components used was less than 20 ppm.

The electrochemical testing was carried out at 20° C. The charging of the cell was carried out by the cc/cv (constant current/constant voltage) method using a constant current of 5 mA/g (corresponds to C/25) in the first cycle and of 60 mA/g (corresponds to C/2) in the subsequent cycles and after reaching the voltage limit of 4.2 V at a constant voltage until the current went below a value of 1.2 mA/g (corresponds to C/100) or 15 mA/g (corresponds to C/8). The discharging of the cell was carried out by the cc (constant current) method using a constant current of 5 mA/g (corresponds to C/25) in the first cycle and of 60 mA/g (corresponds to C/2) in the subsequent cycles until the voltage limit of 3.0 V had been reached. The specific current selected was based on the weight of the coating of the positive electrode.

Due to the formulation in examples 2 and 3, the lithium ion battery was operated by cell balancing with partial lithiation.

Figure 4:
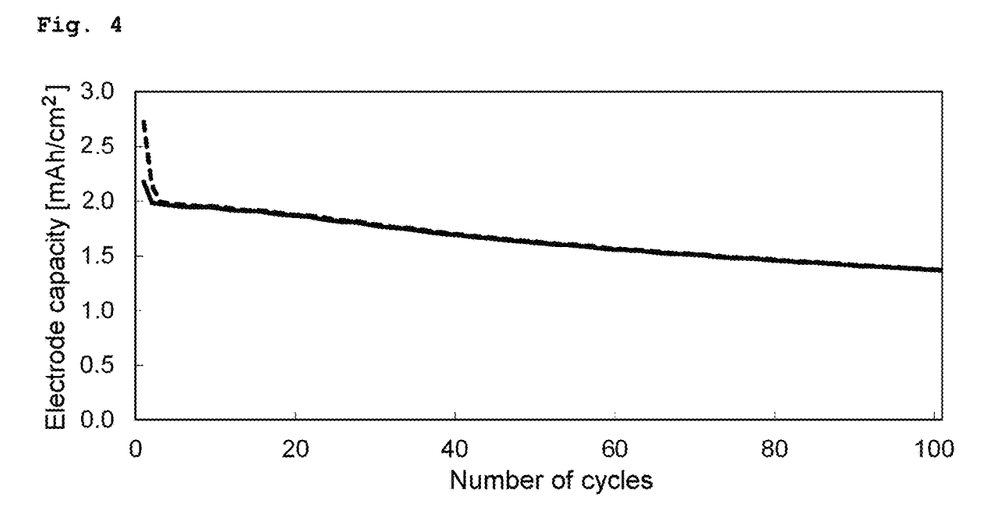
FIG. 4 shows the charging capacity (broken line) and discharging capacity (solid line) of the battery of Example 3.

FIG. 4 shows the charging capacity (broken line) and discharging capacity (solid line) of a full cell based on the anode coating from example 2 as a function of the number of cycles. The full cell has a reversible initial capacity of 1.99 mAh/cm$^2$ in the second cycle and still has 80% of its original activity after 60 charging/discharging cycles.

COMPARATIVE EXAMPLE 4

Production of nanosize, splinter-shaped, unaggregated silicon particles by milling:

As described in example 1, but with a milling time of 600 minutes.

Nanosize, splinter-shaped, unaggregated silicon particles were obtained. The solids content of the suspension was set to 22.3% by weight by addition of ethanol.

Measurement of the particle distribution by static laser light scattering using the Mie model by means of a Horiba LA 950 in a greatly diluted suspension in ethanol gave a size distribution with $d_{10}$=0.09 µm, $d_{50}$=0.18 µm and $d_{90}$=0.32 µm.

Figure 5:
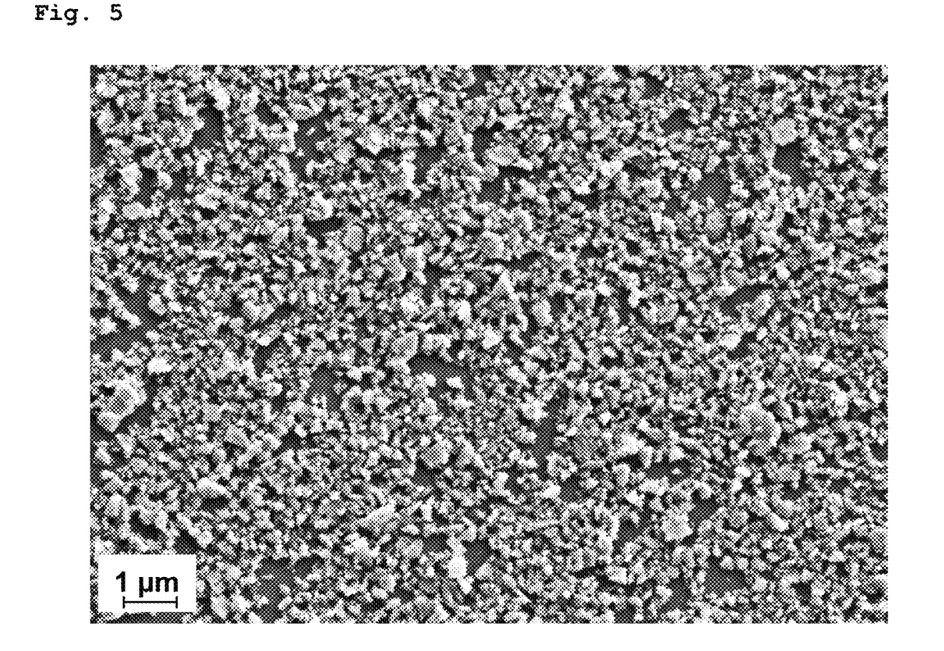
FIG. 5 shows a scanning electron micrograph of the silicon particles of Comparative Example 4.

The scanning electron micrograph of the dry Si dust in FIG. 5 shows that the sample consists of nanosize, splinter-shaped, unaggregated particles.

COMPARATIVE EXAMPLE 5

Production of an anode using the silicon particles from comparative example 4, graphite, conductive carbon black and binder by physical mixing:

3.03 g of the 22.3% strength by weight Si suspension in ethanol as per comparative example 4 and 0.41 g of conductive carbon black (Imerys, Super P Li) were dispersed in 19.35 g of a 1.4% strength by weight solution of sodium carboxymethylcellulose (Daicel, Grade 1380) in water by means of a high-speed mixer at a circumferential velocity of 4.5 m/s for 15 minutes and of 17 m/s for 45 minutes with cooling at 20° C. After addition of 2.04 g of graphite (Imerys, SFG6), the mixture was then stirred for 30 minutes at a circumferential velocity of 12 m/s. After degassing, the dispersion was applied by means of a film drawing frame having a gap height of 0.20 mm (Erichsen, Model 360) to a copper foil having a thickness of 0.030 mm (Schlenk Metallfolien, SE-Cu58). The anode coating produced in this way was subsequently dried at 80° C. and an air pressure of 1 bar for 60 minutes. The average weight per unit area of the dry anode coating was 2.18 mg/cm$^2$.

Figure 6:
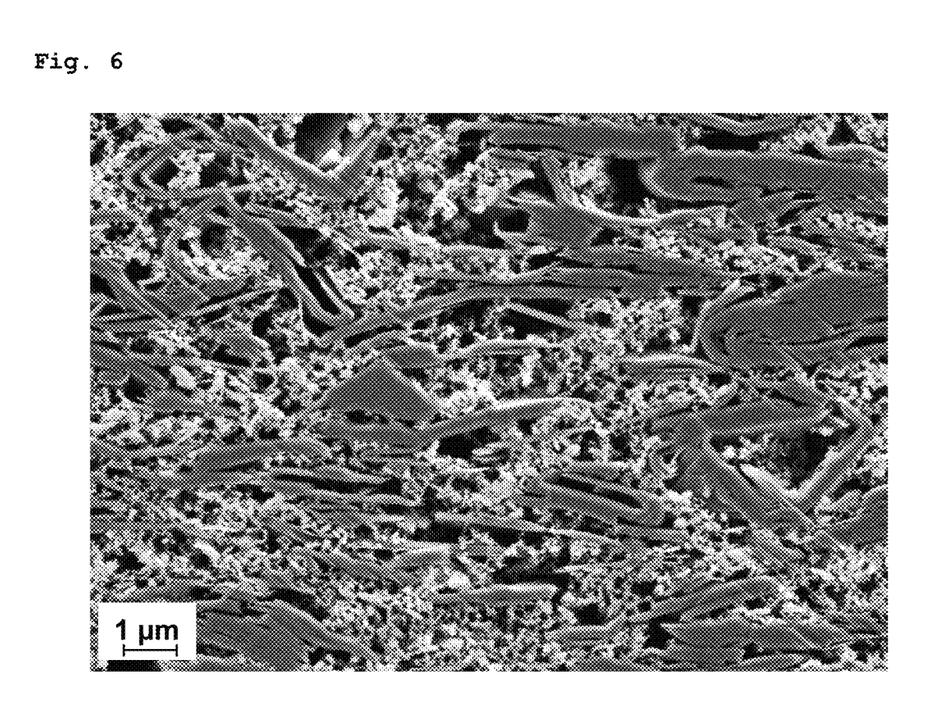
FIG. 6 shows a scanning electron micrograph of the ion ramp section of the anode coating of Comparative Example 5.

FIG. 6 shows a scanning electron micrograph of an ion ramp section of the anode coating with the nanosize, splinter-shaped, unaggregated silicon particles to be seen between the darker graphite pieces.

COMPARATIVE EXAMPLE 6

CEx. 6

Lithium ion battery with the anode from comparative example 5:

The anode comprising the splinter-shaped nanosize silicon particles from comparative example 5 was tested as described in example 3.

Due to the formulation in comparative example 5, the lithium ion battery was operated with maximum lithiation.

Figure 7:
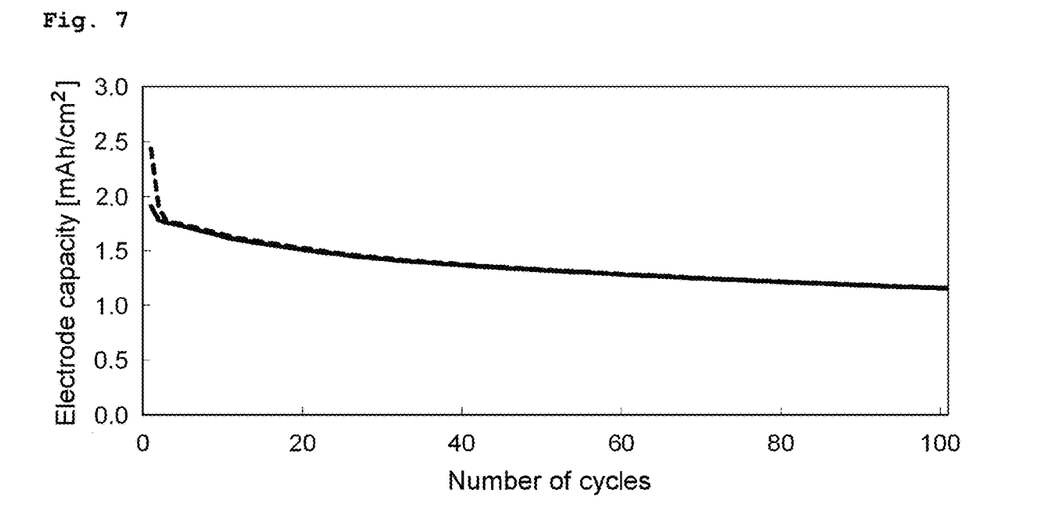
FIG. 7 shows the charging capacity (broken line) and discharging capacity (solid line) of the battery of Comparative Example 6.

FIG. 7 shows the charging capacity (broken line) and discharging capacity (solid line) of full cells based on the anode coating from comparative example 5 as a function of the number of cycles. The full cell has a reversible initial capacity of 1.78 mAh/cm$^2$ in the second cycle and after only 30 charging/discharging cycles has only 80% of its original capacity.

COMPARATIVE EXAMPLE 7

Figure 8:
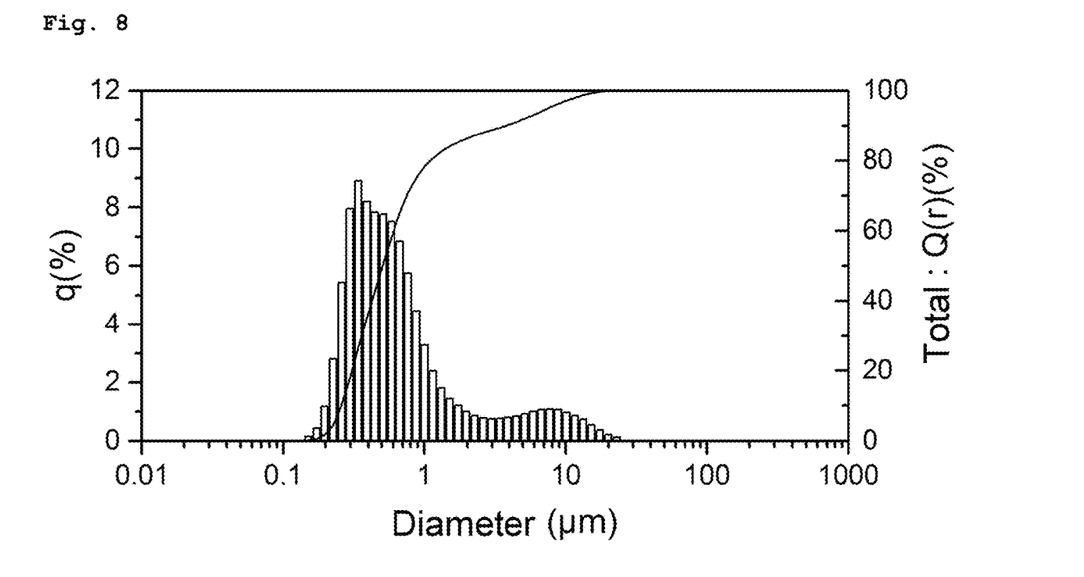
FIG. 8 shows a graph of particle diameter distribution of the silicon particles of Comparative Example 7.

Nanosize, Aggregated Silicon Particles Having a Bimodal Particle Size Distribution The particle distribution of nanosize, aggregated silicon particles (procured from Nanostructured & Amorphous Materials, Inc.) was determined by means of static laser light scattering using the Mie model by means of the measuring instrument Horiba LA 950 in greatly diluted suspension in ethanol. The following measurement results were obtained: $d_{10}$=0.26 µm, $d_{50}$=0.50 µm and $d_{90}$=3.72 µm and a breadth ($d_{90}$–$d_{10}$) of 3.4 µm, as depicted in FIG. 8.

Figure 9:
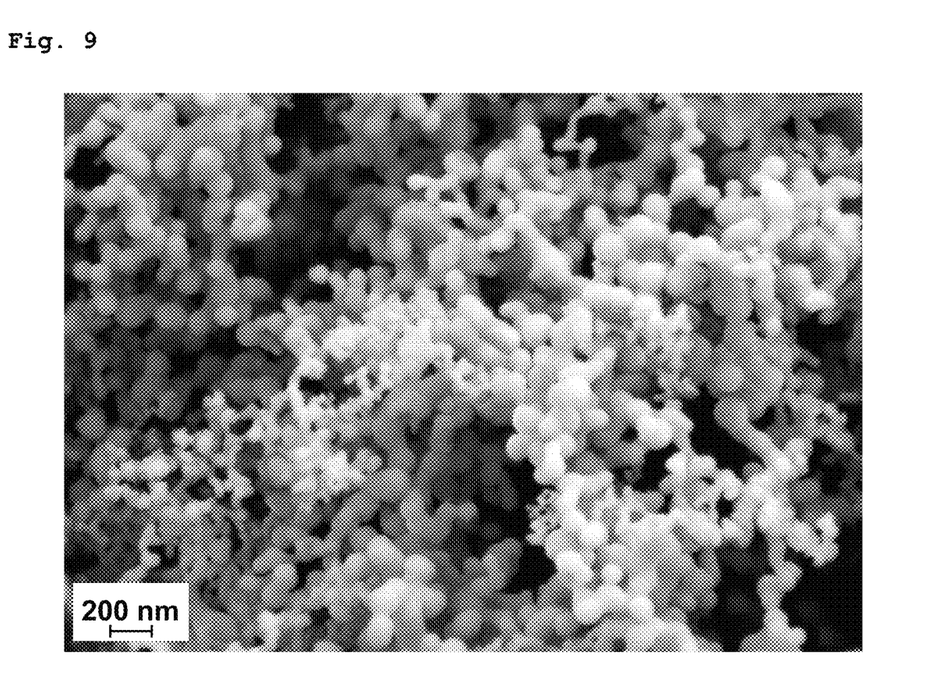
FIG. 9 shows a scanning electron micrograph of the silicon particles of Comparative Example 7.

The scanning electron micrograph of the abovementioned powder in FIG. 9 shows that the particles are aggregated, nanosize silicon particles made up of spherical primary particles having a size of from 70 to 100 nm.

Comparative example 7 demonstrates that measurements by means of static laser light scattering and particle size distributions resulting therefrom, for example $d_{10}$, $d_{50}$, $d_{90}$ and $d_{90}$–$d_{10}$, do not allow conclusions as to the shape, size and state of aggregation of the particles. Static laser light scattering is blind to these parameters. Thus, static laser light scattering cannot differentiate between unaggregated submicron-size particles and nanosize particles which are aggregated to form submicron-size units. Only additional scanning electron micrographs can clarify this.

COMPARATIVE EXAMPLE 8

Lithium ion battery comprising anode material containing the nanosize, aggregated silicon particles from comparative example 7:

An anode was firstly produced by a method analogous to example 2, with the difference that the particles from comparative example 7 were used as silicon particles. A lithium ion battery was produced from the anode obtained in this way and was tested as described in example 3. The lithium ion battery of comparative example 8 has a reversible initial capacity of 1.82 mAh/cm² in the second cycle and after only 32 charging/discharging cycles has only 80% of its original capacity. The lithium ion battery of comparative example 8 is therefore left far behind the performance characteristics of example 3.

The testing results of example 3 and also comparative examples 6 and 8 are summarized in table 1. The lithium ion battery of example 3 surprisingly shows a lower irreversible loss of capacity in the first cycle (=higher initial capacity) and more stable electrochemical behavior in the following cycles compared to the lithium ion batteries of comparative examples 6 and 8.

TABLE 1

Testing results of (comparative) examples 3, 6 and 8.

| (C)Ex. | $d_{50}{}^{a)}$ [μm] | Particle morphology$^{a)}$ | Li/Si ratio [molar] | Discharging capacity after cycle 1 [mAh/cm²] | Number of cycles with ≥80% capacity retention |
|---|---|---|---|---|---|
| 3 | 0.79 | Splinter-shape, unaggregated | 1.1$^{b)}$ | 1.99 | 60 |
| 6 | 0.18 | Splinter-shape, unaggregated | 4.0$^{c)}$ | 1.78 | 30 |
| 8 | 0.50 | Spherical, aggregated | 1.1$^{b)}$ | 1.82 | 32 |

$^{a)}$Particle distribution $d_{50}$ or particle morphology of the silicon particles;
$^{b)}$Lithium ion battery in the fully charged state with partially lithiated anode material;
$^{c)}$Lithium ion battery in the fully charged state with highly lithiated anode material.

The invention claimed is:

1. An anode material for lithium ion batteries, said anode material comprising:
   silicon particles obtainable by milling processes,
   at least one binder,
   graphite,
   optionally one or more further electrically conductive components and
   optionally one or more additives,
wherein the silicon particles are unaggregated, have a shape that is not fibrous, thread-like, lock-like or entangled, and have a volume-weighted particle size distribution between diameter percentiles 3 μm≥$d_{10}$≥0.2 μm and $d_{90}$≤10.0 μm and also $d_{50}$ of from 0.6 to 7.0 μm and a breadth $d_{90}$–$d_{10}$<10 μm determined by static laser light scattering using a Mie model using a Horiba LA 950 particle size analyzer with ethanol as a dispersing medium for the silicon particles, and wherein the anode material contains from 40 to 80% by weight of the silicon particles, from 5 to 30% by weight of graphite, from 0 to 40% by weight of the further electrically conductive components, greater than 0% by weight of the at least one binder and up to 25% by weight of the at least one binder, where figures in percent by weight are based on a total weight of the anode material and proportions of all constituents of the anode material add up to 100% by weight.

2. The anode material as claimed in claim 1, wherein the silicon particles have a volume-weighted particle size distribution with diameter percentiles $d_{10}$ of ≤1 μm.

3. The anode material as claimed in claim 1, wherein the silicon particles have a volume-weighted particle size distribution with diameter percentiles $d_{90}$ of ≥0.5 μm.

4. The anode material as claimed in claim 1, wherein the silicon particles have a volume-weighted particle size distribution having a breadth $d_{90}$–$d_{10}$ of ≥0.6 μm.

5. The anode material as claimed in claim 1, wherein the silicon particles have a volume-weighted particle size distribution with diameter percentiles $d_{50}$ of from 0.7 to 7.0 μm.

6. The anode material as claimed in claim 1, wherein the silicon particles have a sphericity of 0.3≤ψ≤0.9.

7. The anode material as claimed in claim 1, wherein the silicon particles are produced by milling processes using planetary ball mills, jet mills, or stirred ball mills.

8. A method for producing lithium ion batteries, said method comprising using the anode material of claim 1 as an anode of the lithium ion batteries.

9. A lithium ion battery comprising an anode based on the anode material of claim 1.

10. The lithium ion battery as claimed in claim 9, wherein the lithium ion battery is operated in such a way that the anode material is only partially lithiated when the lithium ion battery is fully charged.

11. The lithium ion battery as claimed in claim 10, wherein a ratio of lithium atoms to silicon atoms in the partially lithiated anode material of the fully charged battery is ≤2.2.

12. The lithium ion battery as claimed in claim 10, wherein a capacity of the silicon of the anode material of the lithium ion battery is utilized to an extent of ≤50%, based on a maximum capacity of 4200 mAh per gram of silicon.

13. The anode material as claimed in claim 1, comprising the at least one binder, which comprises polyacrylic acid, polymethacrylic acid or alkali metal salts thereof.

14. The anode material as claimed in claim 2, wherein the silicon particles have a volume-weighted particle size distribution with diameter percentiles $d_{90}$ of ≥0.5 μm.

15. The anode material as claimed in claim 14, wherein the silicon particles have a volume-weighted particle size distribution having a breadth $d_{90}$–$d_{10}$ of ≥0.6 μm.

16. The anode material as claimed in claim 15, wherein the silicon particles have a volume-weighted particle size distribution with diameter percentiles $d_{50}$ of from 0.7 to 7.0 μm.

17. The anode material as claimed in claim 16, wherein the silicon particles have a sphericity of 0.3≤ψ≤0.9.

18. The anode material as claimed in claim 17, wherein the silicon particles are produced by milling processes using planetary ball mills, jet mills, or stirred ball mills.

19. The anode material as claimed in claim 18, comprising the at least one binder, which comprises polyacrylic acid, polymethacrylic acid or alkali metal salts thereof.

20. A lithium ion battery comprising an anode based on the anode material of claim 19.

21. The lithium ion battery as claimed in claim 20, wherein the lithium ion battery is operated in such a way that the anode material is only partially lithiated when the lithium ion battery is fully charged.

22. The lithium ion battery as claimed in claim 21, wherein a ratio of lithium atoms to silicon atoms in the partially lithiated anode material of the fully charged battery is ≤2.2.

23. The lithium ion battery as claimed in claim 21, wherein a capacity of silicon of the anode material of the lithium ion battery is utilized to an extent of ≤50%, based on a maximum capacity of 4200 mAh per gram of silicon.

24. A method of operating the lithium ion battery of claim 9, wherein the anode material is only partially lithiated in a fully charged lithium ion battery.

25. The anode material as claimed in claim 1, wherein the silicon particles have sharp-edged or splinter-like fracture surfaces.

26. The anode material as claimed in claim 1, wherein the shape of the silicon particles is selected from particle shape I, particle shape II or particle shape III according to DIN ISO 3435.

* * * * *